US007027821B2

(12) United States Patent
Rehkopf

(10) Patent No.: US 7,027,821 B2
(45) Date of Patent: Apr. 11, 2006

(54) SYSTEM AND METHOD FOR ACCESSING COMPUTER SERVICES VIA A WIRELESS NETWORK

(75) Inventor: Thomas W. Rehkopf, Roswell, GA (US)

(73) Assignee: BellSouth Intellectual Property Corporation, Atlanta, GA (US)

( * ) Notice: Subject to any disclaimer, the term of this patent is extended or adjusted under 35 U.S.C. 154(b) by 502 days.

(21) Appl. No.: 10/058,721

(22) Filed: Jan. 28, 2002

(65) Prior Publication Data

US 2003/0144008 A1 Jul. 31, 2003

(51) Int. Cl.
*H04Q 7/20* (2006.01)
(52) U.S. Cl. ................ 455/456.1; 455/466; 455/404.2; 455/456.3; 455/456.5; 455/427
(58) Field of Classification Search ............. 455/456.1, 455/456.6, 452, 406, 410, 411, 456.3, 456.5, 455/427, 12.1, 404.2, 414.1, 414.2, 414.4, 455/466; 701/213, 214; 709/218, 219
See application file for complete search history.

(56) References Cited

U.S. PATENT DOCUMENTS

| | | | | | |
|---|---|---|---|---|---|
| 5,893,096 | A | * | 4/1999 | Nakamura .................... | 707/10 |
| 6,091,956 | A | * | 7/2000 | Hollenberg .............. | 455/456.5 |
| 6,256,498 | B1 | | 7/2001 | Ludwig ........................ | 455/433 |
| 6,347,281 | B1 | * | 2/2002 | Litzsinger et al. .......... | 701/213 |
| 6,397,054 | B1 | * | 5/2002 | Hoirup et al. ............ | 455/404.1 |
| 6,484,096 | B1 | * | 11/2002 | Wong et al. ................ | 701/213 |
| 6,515,595 | B1 | | 2/2003 | Obradovich et al. ........ | 340/905 |
| 6,522,875 | B1 | * | 2/2003 | Dowling et al. .......... | 455/414.3 |
| 6,526,335 | B1 | | 2/2003 | Treyz et al. .................... | 701/1 |
| 6,711,474 | B1 | * | 3/2004 | Treyz et al. .................... | 701/1 |
| 2001/0054087 | A1 | * | 12/2001 | Flom et al. ................. | 709/218 |
| 2002/0006787 | A1 | * | 1/2002 | Darby ........................ | 455/419 |
| 2002/0035607 | A1 | * | 3/2002 | Checkoway et al. ........ | 709/206 |
| 2002/0042266 | A1 | * | 4/2002 | Heyward et al. ............ | 455/414 |
| 2002/0045456 | A1 | * | 4/2002 | Obradovich .............. | 455/457 |
| 2002/0056100 | A1 | | 5/2002 | Shimomura | |
| 2002/0058520 | A1 | * | 5/2002 | Nakagawa .................. | 455/456 |
| 2002/0068592 | A1 | * | 6/2002 | Hutcheson et al. ......... | 455/501 |

(Continued)

FOREIGN PATENT DOCUMENTS

JP    2002081956 A  *  3/2002

OTHER PUBLICATIONS www.hz.com/index.htm; "Welcome to the new Hz!": printed Oct. 4, 2005; 5 pages.

*Primary Examiner*—Sonny Trinh
*Assistant Examiner*—Huy Phan
(74) *Attorney, Agent, or Firm*—Lee & Hayes, PLLC

(57) ABSTRACT

Server access is provided to a wireless apparatus via a wireless network. A message is received containing a service request. The service and sever capable of servicing the service request is determined. The service is requested from the server and a reply is received. The reply is formatted for communication over the wireless network and sent. Location dependent information may also be requested with a wireless apparatus including a global positioning device and a two-way wireless communication device. Such an apparatus can "know" its global location and therefore can request information dependent on that location. The apparatus receives signals from a global positioning system and calculates a location. The calculated location is included in the service request sent over the wireless network.

22 Claims, 4 Drawing Sheets

U.S. PATENT DOCUMENTS

| | | |
|---|---|---|
| 2002/0082774 A1* | 6/2002 | Bloebaum .................. 701/213 |
| 2002/0120581 A1 | 8/2002 | Schiavone |
| 2002/0120600 A1 | 8/2002 | Schiavone |
| 2002/0120692 A1 | 8/2002 | Schiavone |
| 2002/0120702 A1 | 8/2002 | Schiavone |
| 2002/0120705 A1 | 8/2002 | Schiavone |
| 2002/0120748 A1 | 8/2002 | Schiavone |
| 2002/0123908 A1 | 9/2002 | Ando et al. |
| 2002/0164998 A1* | 11/2002 | Younis ...................... 455/456 |
| 2002/0177476 A1* | 11/2002 | Chou ......................... 455/574 |
| 2003/0009385 A1* | 1/2003 | Tucciarone et al. ........... 705/26 |
| 2003/0036962 A1* | 2/2003 | Holt ............................ 705/26 |
| 2003/0050081 A1* | 3/2003 | Huber ....................... 455/466 |
| 2003/0134648 A1* | 7/2003 | Reed et al. ................. 455/456 |
| 2004/0054890 A1* | 3/2004 | Vasseur ..................... 713/156 |
| 2005/0033707 A1 | 2/2005 | Ehlers |
| 2005/0169255 A1 | 8/2005 | Shimomura |

* cited by examiner

SYSTEM AND METHOD FOR ACCESSING COMPUTER SERVICES VIA A WIRELESS NETWORK

FIELD OF THE INVENTION

The invention generally relates to the field of wireless communication. More particularly, the invention relates to accessing a computer application from a wireless apparatus.

BACKGROUND OF THE INVENTION

Two-way wireless e-mail pagers have become popular in recent years. Such wireless pagers can provide access to e-mail from remote locations. For example, a user of a Research In Motion wireless e-mail pager (available from Cingular Wireless, Atlanta, Ga.) can send and receive e-mail over a wireless communication network. With such a pager, the user can stay in contact even while driving a car, taking a bus, walking through a park, etc. Some two-way wireless communication devices provide e-mail services but do not provide access to many server based applications that are now available over the Internet. Some higher end two-way wireless communication devices do provide full access to Internet services; however, they are typically more expensive to purchase and typically have more expensive monthly access fees.

Additionally, two-way wireless pagers do not contain information regarding the specific location of the device. Therefore, wireless pagers cannot easily request location dependent information, which may be valuable information. For example, a user may want to know the location of the closest Chinese Restaurant. Because two-way wireless pagers do not "know" their location, requesting the location of the nearest Chinese Restaurant can be difficult.

In view of the foregoing, there is a need for accessing a computer application via a wireless communication network and for requesting location dependent information.

SUMMARY OF THE INVENTION

The invention is directed to accessing a computer application from a wireless apparatus.

The wireless apparatus receives an indication of a service request from a user interface of the wireless apparatus. The wireless apparatus formats the service request indication as a message for communication over a wireless network and sends the formatted service request message over the wireless network.

The wireless apparatus may also request information that is dependent on the location of the wireless apparatus. To request such information, the formatted service request message includes an indication of the location of the wireless apparatus. The location indication may be entered by the user or automatically determined by the wireless apparatus. To automatically determine the location of the wireless apparatus, the apparatus may include a global positioning device that receives signals from a global positioning system and calculates the location of the apparatus based upon the received signals. The calculated location may be included in the formatted service request message.

The formatted service request message may be sent to an integration server comprising wireless communication ports that receive the message and an integration application that processes the received message. The integration application parses a service request indication and optionally a location indication from the received message and determines a sever capable of servicing the service request. The service is requested from the server. Location information may also be sent to the server. A reply is received from the server and formatted for communication over the wireless network. The formatted reply is sent over the wireless network to the wireless apparatus.

The above-listed features, as well as other features, of the invention will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the several views of the drawings, and wherein.

DETAILED DESCRIPTION OF ILLUSTRATIVE EMBODIMENTS

Figure 1:
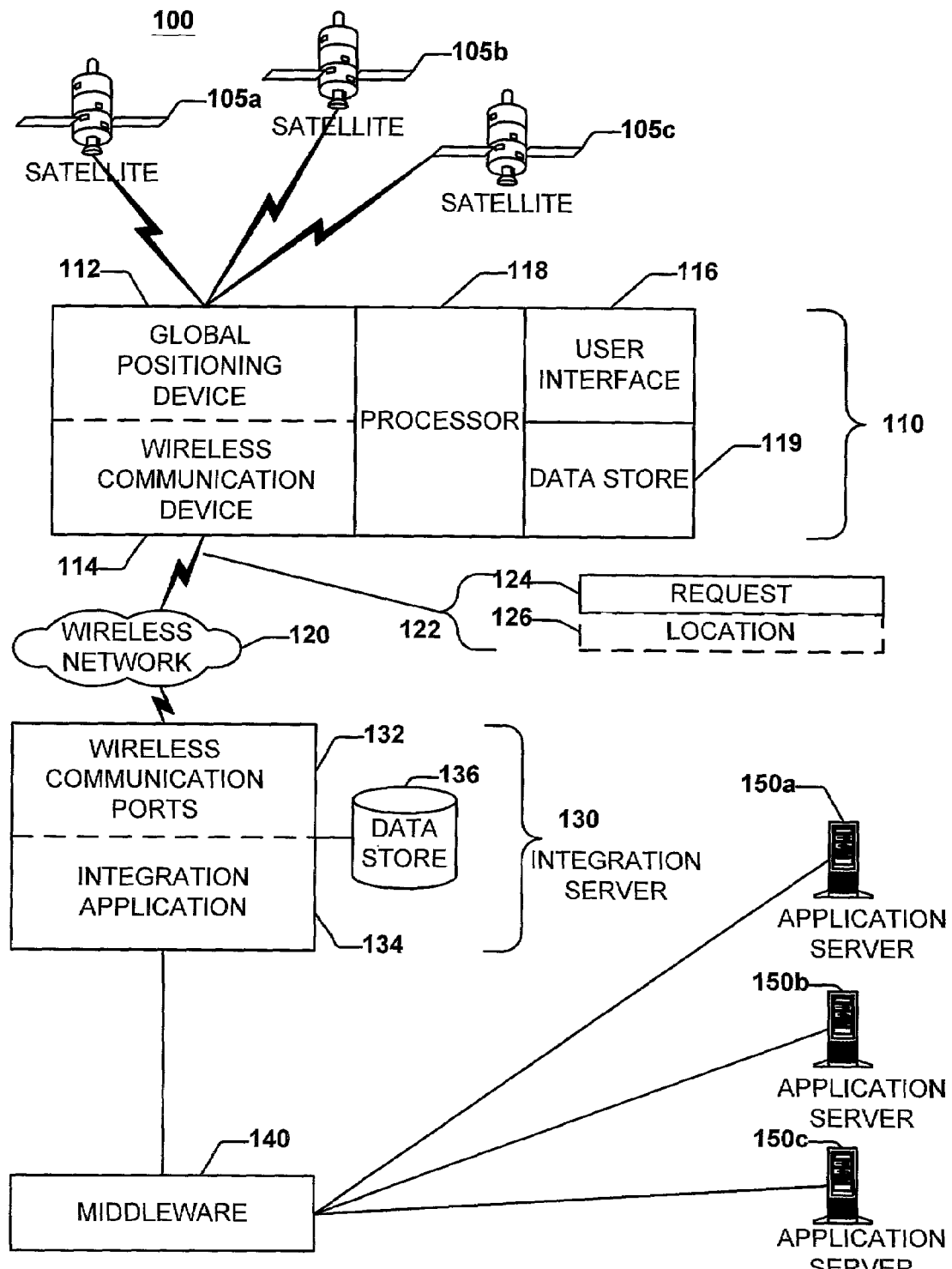
FIG. 1 is a block diagram of an illustrative system for accessing a computer application via an illustrative wireless communication apparatus, in accordance with an embodiment of the invention.

FIG. 1 is a diagram of an illustrative environment 100 including an illustrative system (i.e., integration server 130) for accessing a computer application on an application server 150 via a wireless communication apparatus 110. As shown in FIG. 1, wireless communication apparatus 110 comprises a wireless communication device 114, a user interface 116, a processor 118, a data store 119, and optionally a global positioning device 112.

Global positioning device 112 is operable to receive signals from satellites 105a, 105b, and 105c and to determine a global location based on the received signals. Satellites 105a, 105b, and 105c may be part of the Global Positioning System (GPS) that includes a constellation of satellites, ground stations, data links, and control facilities maintained by the United States Department of Defense. The GPS makes it possible for users (not shown) to determine their position and to navigate anywhere in the world. The GPS was originally designed by the military to provide precise location information to track the movement of troops and equipment and to navigate military ships and aircraft. Recently however, the GPS has been used in commercial and civilian applications as well. GPS devices have been used in surveying and mapping, in aviation, marine, automobile navigation, backpacking, hiking, emergency rescue, and the like.

The GPS is made up of a number of satellites that orbit the earth and continually transmit the precise time and their position in space. Previously, civilian GPS signals were purposefully degraded for military security reasons in a practice referred to as Selective Availability. In May 2000 Selective Availability was discontinued so that the same units that previously were only accurate to within approximately 100 meters horizontally and 150 meters vertically, are now accurate to within approximately 10 meters horizontally and 15 meters vertically.

Global positioning device 112 receives signals from at least 3 satellites and calculates the precise location of the device by triangulation, using the travel time of a radio message from the satellite to the device for the calculation. Receiving data from additional satellites generally provides a more accurate location calculation.

Wireless communication device 114 is operable to transmit and receive messages via a wireless network 120. Wireless network 120 may be a Mobitex Radio Network (Mobitex) capable of sending and receiving e-mail messages through high frequency radio signals. Mobitex is operated by RAM Mobile Data, and Ardis, which is a joint venture of Motorola and IBM. Mobitex was developed in Sweden by Ericsson/Eritel and has been installed and is maintained in many other countries. For example, in Canada, Mobitex is operated by Roger's Cantel. Mobitex uses packet switched data transfer, which aggregates data into blocks called packets before transmission. Ericsson also manufactures a device called a Mobidem, which is a radio based modem that is capable of transmitting digital information across the Mobitex data communication network. A Mobidem essentially provides an interface between a processor and a Mobitex network.

Wireless communication device 114 may be similar to a Research In Motion pager commercially available from Cingular Wireless, Atlanta, Ga. and may comprise a Mobidem having a Mobitex compatible port. In other embodiments, wireless communication device 114 may be similar to a cellular phone and wireless network 120 may be a cellular telephone network. Wireless communication device 114 and global positioning device 112 may communicate directly with each other or they may communicate through processor 118.

Processor 118 is operable to communicate with wireless communication device 114, user interface 116, global positioning device 112, and data store 119. A user (not shown) may enter commands and information into user interface 116. User interface 116 comprises an input device, such as a keypad, and a display device, such as a liquid crystal display. User interface 116 may also include other input devices such as a light pen, or the like for inputting information into processor 118. Once processor 118 receives data from user interface 116, processor 118 may communicate with integration server 130.

Integration server 130 is operable to transmit and receive messages via wireless network 120. Integration server 130 comprises wireless communication ports 132, an integration application 134, and optionally a data store 136. Wireless communication ports 132 send and receive messages and may comprise a Mobidem having Mobitex compatible ports. Data store 136 may be used to store user information, service request mapping information, application server mapping information, and the like, described in more detail below. Data store 136 may be a hard disk, a memory, and the like.

Integration application 134 communicates with wireless communication ports 132 and with application servers 150a, 150b, and 150c. Integration application 134, therefore, provides an interface between wireless network 120 and application servers 150a, 150b, and 150c, by receiving a message containing a service request (and optionally location information) from wireless network 120 and communicating with an appropriate application server 150 to fulfill the service request, as described in more detail below. Integration application 134 typically uses the services of a middleware 140 to access an appropriate application server 150.

Middleware 140 receives the service request and calls the appropriate application server (e.g., application server 150a, 150b, 150c) to respond to the service request. Middleware 140 may execute on integration server 130, on an application server 150, on a standalone server (not shown), or distributed across multiple servers. Middleware 140 may communicate with integration server 130 and/or application servers 150 via a network (not shown), for example, the Internet, a local area network, a wide area network, or the like. Middleware 140 may be an industry standard middleware, BellSouth standard middleware, or the like.

Application servers 150 execute applications, such as for example, a user authentication application, RealPages[SM] telephone directory service, a bill balance reporting application, a payment history application, and the like. Such applications are normally not accessible to a wireless communication apparatus via e-mail messages. To overcome this disadvantage, an aspect of the invention provides such access via an integration server 130 that acts as an interface between wireless network 120 and application servers 150. Further, another aspect of the invention provides location information in a message for a wireless communication network, thereby allowing location dependent information to be retrieved from application servers 150, as described in more detail below in connection with FIGS. 2 and 3.

Figure 2:
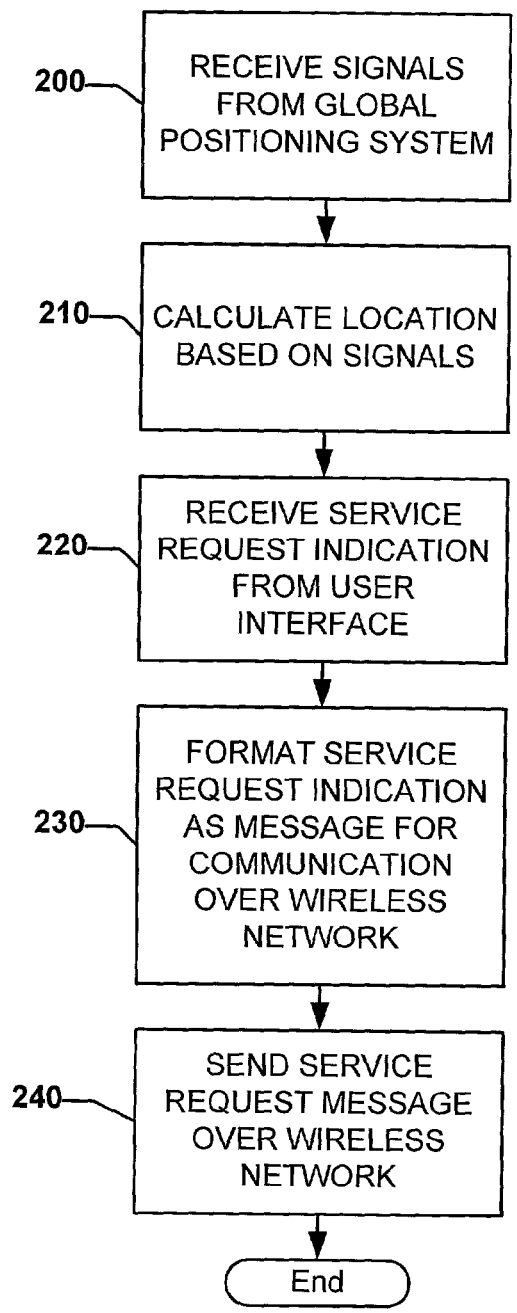
FIG. 2 is a flow diagram of an illustrative method for accessing a computer application via a wireless communication apparatus and illustrating the operation of a portion of the system of FIG. 1, in accordance with an embodiment of the invention.

FIG. 2 is a flow diagram of an illustrative method for providing location information in a message for a wireless communication network. To facilitate illustration of the method, the flow diagram is described contemplating exemplary wireless apparatus 110 having an e-mail address of "user1@bellsouth.com" and an exemplary user located in Wildwood, N.J. looking for the nearest Chinese Restaurant. As shown in FIG. 2, at step 200, global positioning device 112 receives signals from satellites 105a, 105b, and 105c. As described above, satellites 105a, 105b, and 105c may be part of the GPS. Global positioning device 112 receives signals from at least three satellites, and maybe more, if increased location accuracy is desired.

At step 210, global positioning device 112 calculates the location of wireless apparatus 110 based on the received signals. The calculation may be performed according to known global positioning triangulation techniques. Typically, the location is calculated as a global latitude, longitude, and altitude; however, other coordinate systems are contemplated. Global positioning device 112 may calculate the location upon request by processor 118 or at intervals.

Alternatively, at step 210, processor 118 calculates the location after receiving signal information from global positioning device 112. This technique may be utilized to decrease the workload on global positioning device 112 or to allow global positioning device 112 to be a less complex device.

Global positioning device 112 may send the calculated location to processor 118 upon request by processor 118 or at intervals. Alternatively, global positioning device 112 device comprises a register, a memory location, or the like, that is accessible to processor 118 for containing the calculated location. With this alternative technique, processor 118 reads the register to determine the calculated location.

To illustrate operation at step 210, if wireless communication apparatus 110 is located in Wildwood, N.J., wireless communication apparatus 110 may calculate a latitude of 39.0 and a longitude of −74.8 based on signals received at step 200 from the GPS satellites. This latitude and longitude corresponds to a location in Wildwood, N.J. and can be used by wireless communication apparatus 110 in conjunction with integration server 130 to provide location dependent information, as described in more detail below.

At step 220, processor 118 receives an indication of the service request from user interface 116. The indication of the service request may take many forms, but any form that can be appropriately interpreted by integration server 130 is acceptable. To illustrate one format by example, processor 118 may receive from user interface 116 an e-mail message addressed to "info@bellsouth.com," addressed from "user1@bellsouth.com," and having a message text of "Where is the closest Chinese Restaurant?"

At step 230, processor 118 formats the service request indication as a message for communication over wireless network 120. Processor 118 may also include the calculated location information in the formatted service request message. To illustrate, the service request indication may be formatted into a service request message 122 that includes a request portion 124 and a location portion 126. In keeping with the example above, processor 118 appends the calculated latitude and longitude of 39.0 and −74.8 to the e-mail message resulting in a formatted e-mail message text of "Where is the closest Chinese Restaurant?* 39.0, −74.8." Processor 118 may insert an asterisk, a comma, a line return, or the like to demarcate the beginning of location portion 126. As illustrated, an asterisk has been inserted to demarcate and separate location portion 126 from request portion 124.

Figure 3:
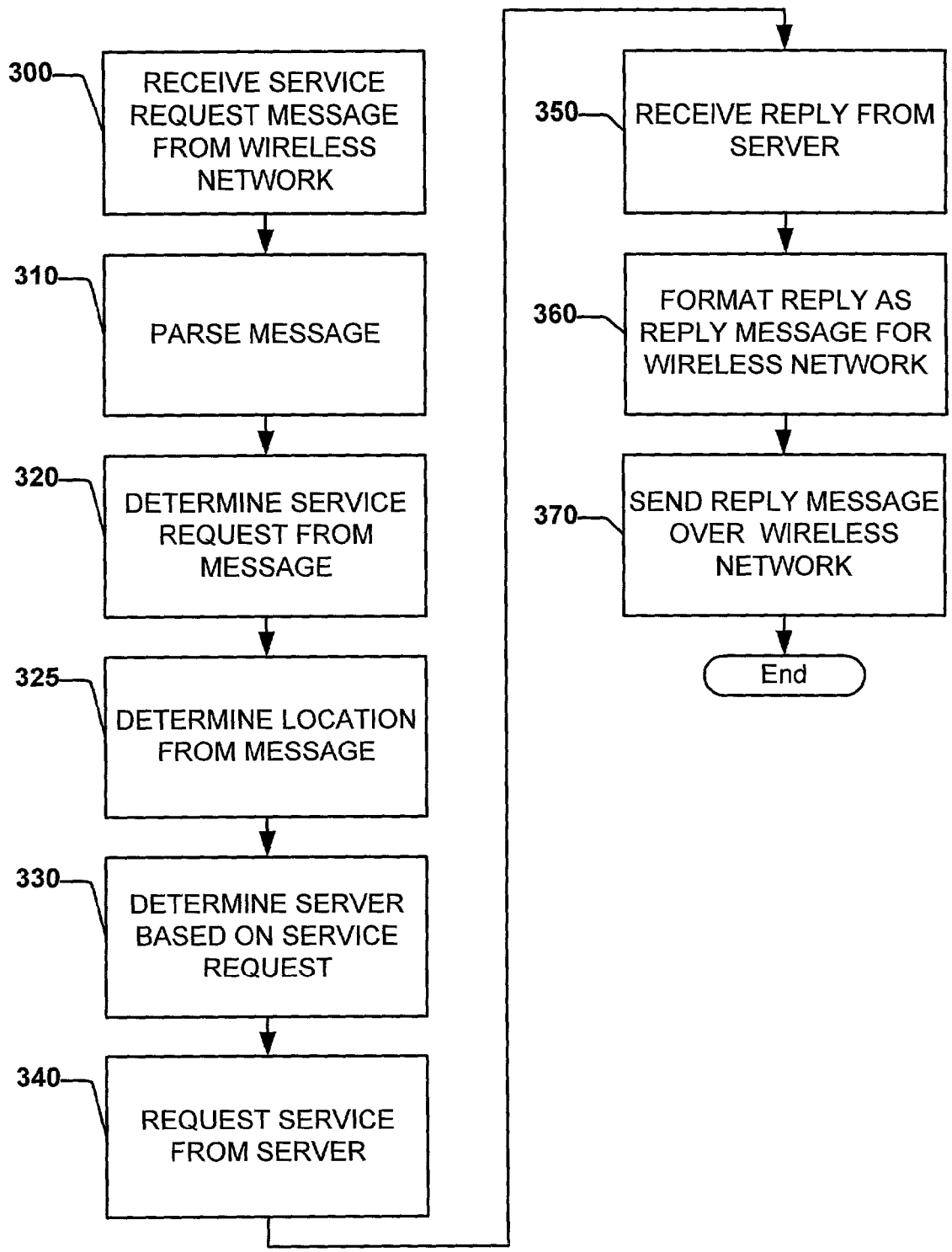
FIG. 3 is a flow diagram of an illustrative method for accessing a computer application via a wireless communication apparatus and illustrating the operation of a portion of the system of FIG. 1, in accordance with an embodiment of the invention.

At step 240, processor 118 causes the formatted service request message to be sent over wireless network 120, via wireless communication device 114. For example, the message may be an e-mail message containing the text "Where is the closest Chinese Restaurant?* 39.0, −74.8." and may be sent to integration server 130 (at address "info@bellsouth.com") over wireless network 120 for processing of the service request message. FIG. 3 shows an illustrative method for processing a service request message received at integration server 130.

At step 300, wireless communication ports 132 receive the formatted service request message from wireless network 120. In turn, integration application 134 receives the service request message from wireless communication ports 132. For example, integration application 134 receives an e-mail message containing message text "Where is the closest Chinese Restaurant?* 39.0, −74.8."

At step 310, integration application 134 parses the service request message into request portion 124 and location portion 126. In the example, the e-mail message is parsed into request portion 124 that contains text "Where is the closest Chinese Restaurant?" and location portion 126 that contains text "39.0, −74.8."

At step 320, integration application 134 determines the service requested based on request portion 124. Several techniques may be employed to determine the service request. Typically, there is a mapping from the contents of request portion 124 to a service. According to one technique, each service is associated with a keyword or keywords. For example, the keywords "where and closest" may be mapped to a business directory service that locates the closest business of a selected type. In another technique, a natural language understanding engine maps from request portion 124 to a service. In yet another technique, each service is associated with a number. Using this technique, request portion 124 contains a number that corresponds to a service. Numbers and corresponding services are predefined and are accessible to apparatus 110 and integration server 130. Apparatus 110 uses the mapping to create a service request message having an appropriate service request indication and integration server 130 uses the mapping to "decode" the service request indication. The mapping may be implemented in a data table, a spreadsheet, a relational database, or the like, and may be stored in data store 136, in apparatus 110, in integration server 130, in both, in another server, or the like. In the above example, at this step, integration application 134 determines that a business directory service is requested based on the text "Where is the closest Chinese Restaurant?"

At step 325, integration application 134 determines the location of wireless apparatus 110 from the contents of location portion 126 of the service request message. For example, integration application 134 reads a latitude and longitude of "39.0, −74.8." from location portion 126 of the service request message.

At step 330, integration application 134 determines a server capable of servicing the service request. To determine an appropriate server, integration server 130 maps from the service request to an application server 150. The mapping may be implemented in a data table, a spreadsheet, a relational database, or the like, and may be stored in data store 136, for example. Alternatively, middleware 140 may implement mapping from the service request to an application server 150. For example, integration application 134 may determine that application server 150a provides a business directory service.

At step 340, integration application 134 requests the service from the appropriate application server 150. The request typically is converted to a format appropriate for the application server. Integration application 134 typically implements such a request through middleware 140 that routes the request to the appropriate application server 150 and coordinates receiving a reply from the appropriate application server 150.

At step 350, integration application 134 receives a reply from the appropriate application server 150, typically via middleware 140. An exemplary reply may contain the text "Cheng's Chinese Restaurant, 1304 Rio Grande Ave., Wildwood, N.J." The reply may also contain a menu, a telephone number, directions to Cheng's from the calculated location of the wireless apparatus 110, and the like. The reply may further comprise listings of other business in the area meeting the user specified criteria.

At step 360, integration application 134 formats the reply as a message appropriate for wireless network 120. The formatted reply message may contain any text suitable for transmission as an e-mail message. For example, integration application 134 creates an e-mail mail message addressed to "user1@bellsouth.com," addressed from "info@bellsouth.com" and having a message text of "Cheng's Chinese Restaurant, 1304 Rio Grande Ave., Wildwood, N.J."

At step 370, integration application 134 causes wireless communication ports 132 to send the formatted reply message to wireless communication apparatus 110. In this manner, a user can access a service typically not available via e-mail and can obtain location dependent information.

Various techniques may be used to implement some of the steps described above and various modifications can be made to the method described above. In one alternative technique, at step 220, user interface 116 displays a window, or the like, to assist the user in making a service request. For example, processor 118 may cause user interface to display a menu containing a limited number of acceptable service request selections. A first selection may be for a business directory lookup, a second selection may be for bill reporting, and the like. Because only acceptable service request selections are displayed in the menu, the user can only select acceptable service requests. In this manner, the chances that integration application 134 will misinterpret a service request is reduced.

The menu can also be multi-leveled. For example, processor 118 may cause user interface 117 to display a first service request selection menu such as described above. Upon selection from the first selection menu, a second selection menu may be displayed that corresponds to another level of selections. For example, upon selection of business directory lookup, the second selection menu may display business categories, such as restaurant, roofing contractors, and the like, similar to the categories of a telephone directory. Further selections may be received in subsequent menus to further define the service request. For example, the category "restaurant" may be divided into subcategories such as "Chinese," "Italian," and the like. In this manner, a user can navigate through a multi-leveled menu system to select and define a desired service request.

If this menu driven technique is employed, then at step 230, processor 118 formats the service request message according to a mapping between menu selections and service request indications. The service request indication may be text based or symbol based. For example, a menu selection of directory service may be mapped to text "directory service" or may be mapped to number "1." In either event, the service request indications are decodable by integration server 134 via a mapping between service request indications and service requests. For example, processor 118 may create an e-mail message addressed to "info@bellsouth.com" having a message text of "Directory Service, Restaurant, Chinese." Alternatively, processor 118 may create an e-mail message addressed to "info@bellsouth.com" having a message text of "1, 47, 7" wherein 1 indicates a request for directory service, 47 indicates a restaurant, and 7 indicates a Chinese restaurant. If location information is embedded in the message, processor 118 may create an e-mail message addressed to "info@bellsouth.com" having a message text of "1, 47, 7, 39.0, −74.8."

Location information may also be entered into wireless communication apparatus 110 manually rather than using a global positioning system, as described in steps 200 and 210. For example, a user may enter into user interface 116 "I'm at the corner of $6^{th}$ and West Streets." With this technique, during step 230, processor 118 formats the service request message with the manually entered information in location portion 126. Using this technique puts more of the burden of determining the location on integration server 134. With this technique, integration application 134 parses location portion 126 and determines a location based on the parsed information. The parsed information comprises a text or natural language description of the location, which is more complex to decode than reading a latitude and longitude. This technique, therefore, may increase the chance for error in determining the location of wireless communication apparatus 110.

Some service requests do not include a request for location dependent information. For example; a user may wish to order a digital subscriber loop for home use. Such a service request is not dependent on the location of the wireless communication apparatus 110. To facilitate such a service request, a method executes steps 220 through steps 240 to produce a message and steps 300–370, excluding step 325, to service the request. This technique allows wireless e-mail access to services that may normally be inaccessible via wireless e-mail access.

Because e-mail access is often text based, the reply messages received by wireless communication apparatus 110 may be less user-friendly than those wireless apparatus with full Internet access. To increase the user-friendliness of wireless communication apparatus 110, it may contain graphical information that is combined with textual information received in reply messages from integration server 134. For example, wireless communication apparatus 110 may contain a graphical mapping application, and a reply message from integration server 130 may include text based location information, such as for example, an address, a latitude and longitude, and the like. The graphical mapping application may read the text based location information and display a graphical map and graphically indicate the location (determined from the text based location information) on the graphical map. In this manner, a text based communication link may provide information in a user-friendly graphical form.

Rather than providing a reply in response to a user service request, integration server 130 may "push" information to wireless communication apparatus 110 at intervals or upon a triggering event. This information may also be dependent on the location of wireless communication apparatus 110. For example, a wireless apparatus user may receive advertisements that are based on the location of the wireless apparatus.

Figure 4:
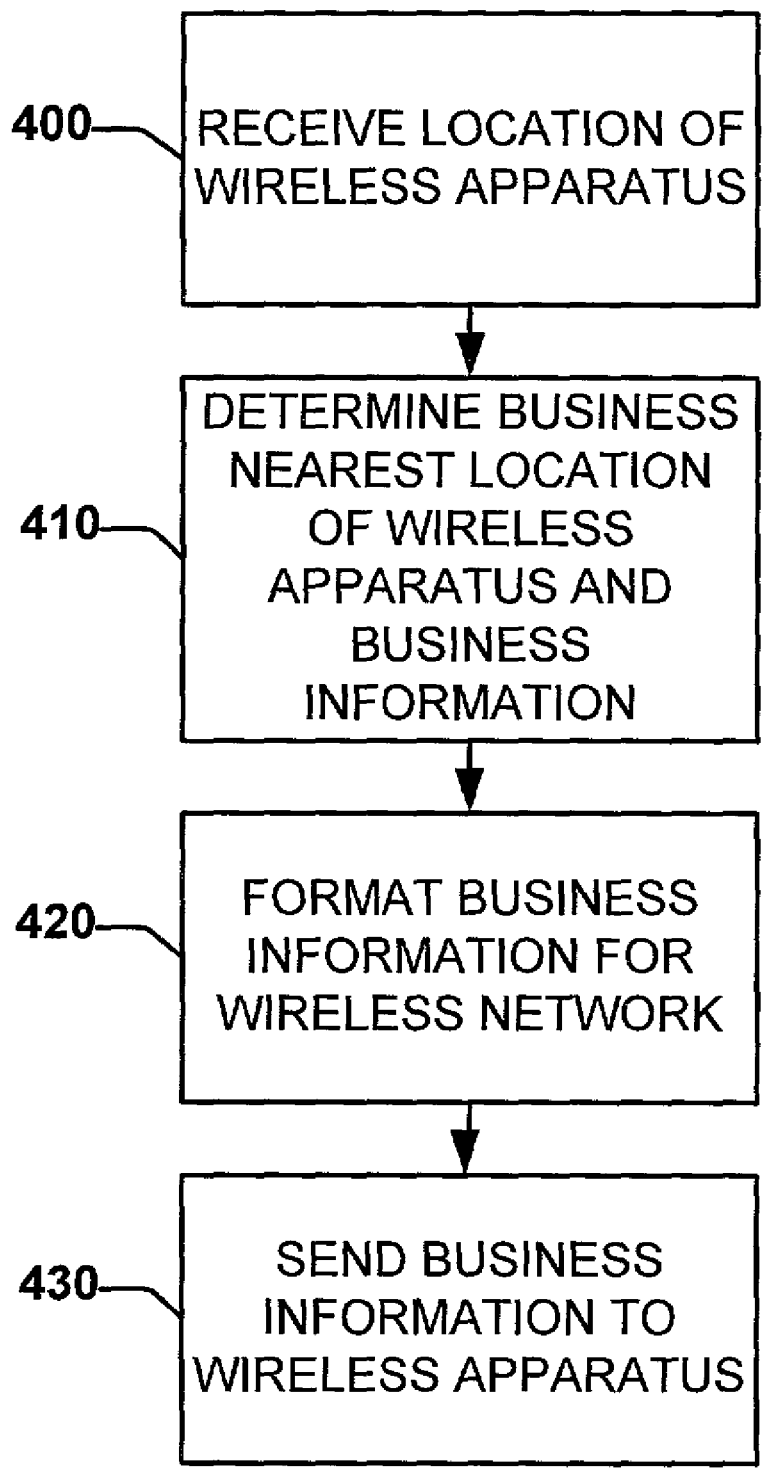
FIG. 4 is a flow diagram of an illustrative method for sending information to a wireless communication apparatus and illustrating the operation of a portion of the system of FIG. 1, in accordance with an embodiment of the invention.

FIG. 4 is a flow diagram of an illustrative method for sending such information to wireless communication apparatus 110. As shown in FIG. 4, at step 400, integration server 130 receives an indication of the location of wireless communication apparatus 110. Integration server 130 may request the location of wireless communication apparatus 110 at intervals. Alternatively, wireless communication apparatus 110 may send the location of wireless communication apparatus 110 at intervals or may send the location based on a criterion, such as for example, when the location changes by a predefined amount.

At step 410, integration server 130 determines a business that is located closest to the received location. Integration server 130 also determines information about the business, for example, the phone number, the address, an advertisement slogan, or the like. Integration server 130 may perform this step or may utilize one of application servers 150 and/or middleware 140 to perform this step.

At step 420, integration server 130 formats the business information for communication over wireless network 120.

At step 430, integration server 130 sends the formatted business information to wireless communication apparatus 110.

The invention may also be used to provide services to a plurality of users. For example, user authentication is an important part of providing access to server based services. Many systems, however, do not have reliable user authentication services. The invention may be used to provide user authentication to various wireless communication apparatus users.

Moreover, the services performed by application servers 150 may be provided on a service for a fee basis. In this manner, a small company could utilize services provided by application servers 150 without having to invest the capital to build an entire system. For example, a small company could use application servers 150 to host some of its processing applications. Employees of the small company could use their pagers to access applications on application server 150 (for example, an employee locator service). Before providing the requested service, integration server 130 may route an electronic pager signature and a password to an authentication server (e.g., one of application servers 150). The authentication server determines if the pager is authorized to access the service requested based on the electronic pager signature and the password. If the pager is authorized to access the requested service, the service request is forwarded to the proper application server 150 which process the request, similar to that described above. After the service is performed, the small company is billed for the service. If the pager is not authorized, the service request is not forwarded to the application server 150 and the integration server 130 may send a user unauthorized message to the pager.

Thus, there has been described an apparatus, system, and method for accessing a computer application via messages from a wireless communication apparatus and for including a location indication in the message to request location dependent information.

Portions of the invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. Portions of the invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing illustrations have been provided merely for the purpose of explanation and are in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. An apparatus for accessing a computer application via a wireless communication network, the apparatus comprising:
   a global positioning device that receives signals from a global positioning system; and
   a two-way wireless communication device in communication with the global positioning device;
   a processor in communication with the global positioning device and in communication with the two-way wireless communication device; and
   a user interface in communication with the processor;
   wherein the processor determines the location of the global positioning device, receives an indication of a service request from the user interface, formats the service request indication into an e-mail message for communication over a wireless network, appends the location of the global positioning device to the e-mail message, wherein the e-mail message includes one of a keyword and a number that is mapped to a particular service, and causes the e-mail message to be sent over the wireless network via the two-way wireless communication device.

2. The apparatus as recited in claim 1, wherein the two-way wireless communication device comprises a Mobitex compatible device.

3. The apparatus as recited in claim 1, wherein the two-way wireless communication device comprises a radio modem.

4. The apparatus as recited in claim 1, wherein the two-way wireless communication device comprises a cellular telephone.

5. The apparatus as recited in claim 1, wherein the service request indication is in a natural language representation.

6. The apparatus as recited in claim 1, wherein the processor inserts a delimiter between the service request indication and the location of the global positioning device.

7. The apparatus as recited in claim 1, wherein the e-mail message includes a keyword that is mapped to a particular service.

8. The apparatus as recited in claim 1, wherein the e-mail message includes a number that is mapped to a particular service.

9. The apparatus as recited in claim 1, further comprising a memory that stores graphical map data and wherein the processor causes a graphical map to be displayed based on the graphical map data and the location indication.

10. The apparatus as recited in claim 1, further comprising a memory that stores graphical map data and wherein the processor receives a second e-mail message including second location information in response to the sent e-mail message and causes a graphical map to be displayed based on the graphical map data and the second location indication.

11. A method for requesting location dependent information, comprising:
   receiving signals from a global positioning system;
   calculating a location based upon the received signals;
   receiving an indication of a service request from a user interface;
   formatting the service request indication as an e-mail message for communication over a wireless network, wherein the e-mail message includes one of a keyword and a number that is mapped to a particular service;
   appending the location to the email message; and
   sending the formatted service request e-mail message over the wireless network.

12. The method as recited in claim 11, wherein receiving signals from a global positioning system comprises receiving signals from at least three satellites.

13. The method as recited in claim 11, wherein calculating a location comprises calculating a latitude and longitude.

14. The method as recited in claim 11, wherein receiving an indication of a service request comprises:
   displaying a menu containing a plurality of service request indications; and
   receiving a selection of one of the plurality of service request indications.

15. The method as recited in claim 11, further comprising receiving a reply message from the wireless network, the reply message containing location dependent information.

16. The method as recited in claim 15, further comprising:
parsing the location dependent information from the message; and
displaying the location dependent information in a graphical form.

17. The method as recited in claim 11, wherein the service request indication is in a natural language representation.

18. The method as recited in claim 11, wherein the e-mail message includes a keyword that is mapped to a particular service.

19. The method as recited in claim 11, wherein the e-mail message includes a number that is mapped to a particular service.

20. A computer-readable medium having instructions stored thereon for requesting location dependent information, the instructions, when executed on a processor, causing the processor to perform the following:
receiving signals from a global positioning system;
calculating a location based upon the received signals;
receiving an indication of a service request from a user interface;
formatting the service request indication as an e-mail message for communication over a wireless network, wherein the e-mail message includes one of a keyword and a number that is mapped to a particular service;
appending the calculated location to the e-mail message; and
sending the formatted service request e-mail message over the wireless network.

21. The computer-readable medium as recited in claim 20, wherein calculating a location comprises calculating a latitude and longitude.

22. The computer-readable medium as recited in claim 20, wherein the instructions further cause the processor to perform receiving a reply message from the wireless network, the reply message containing location dependent information.

* * * * *